Figure 1:
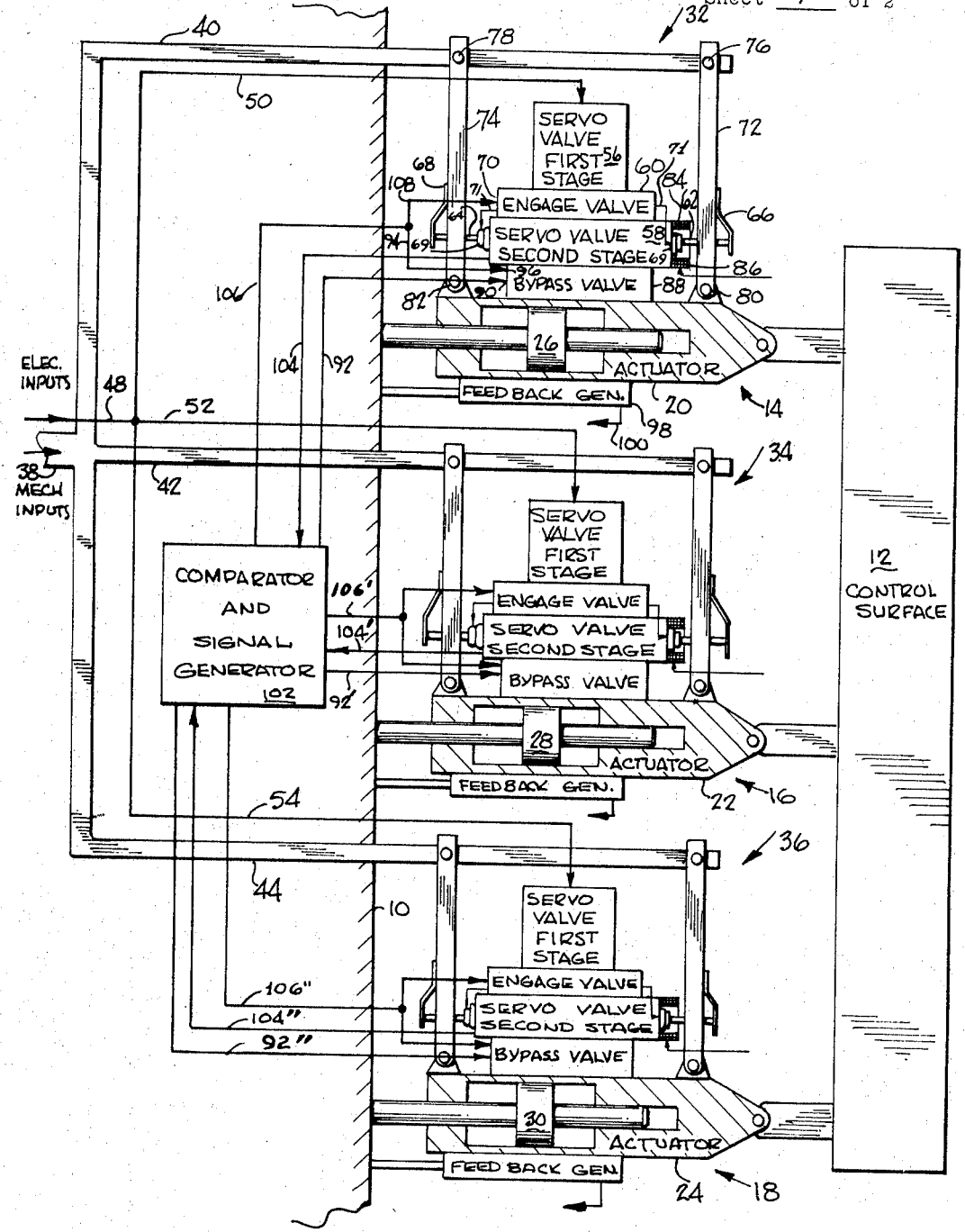

INVENTOR.
GAVIN D. JENNEY

INVENTOR
GAVIN D. JENNEY

United States Patent Office 3,426,650
Patented Feb. 11, 1969

3,426,650
TRIPLE CHANNEL REDUNDANT HYDRAERIC CONTROL SYSTEM
Gavin D. Jenney, Arleta, Calif., assignor to Bell Aerospace Corporation, a corporation of Delaware
Filed Dec. 23, 1965, Ser. No. 515,816
U.S. Cl. 91—216          8 Claims
Int. Cl. F01b 15/00; F15b 9/03, 9/09

This invention relates generally to hydraerically powered control systems and more particularly to redundant control systems wherein hydraeric signals are used for the purpose of comparing the operational status of the parallel, force sharing control channels and then automatically switching out failed channels or portions thereof in response to signals from the failed component.

The term "hydraeric" as used herethroughout is defined as being generic to hydraulic and is pneumatic and synonymous, in a broad sense, with "fluid under pressure." In this regard however, the present invention finds particularly useful application in the field of hydraulic control systems for high performance aircraft and although, in the cause of clarity and brevity of presentation, much of the following description and discussion is directed thereto, it is expressly to be understood that the advantages of the invention are equally well manifest in other fields both hydraulic and pneumatic such as, for example, in the control of machine tools, automatic processing of chemicals, and the control of rockets and underwater missiles or the like.

In the field of controlling high performance aircraft, it is well known that powered systems for positioning of the control surfaces are required. In principle, one control chain or channel, controlled by input signals such as from the pilot, co-pilot, ground control, or from feedback networks and connected to drive or position a particular control surface, is sufficient and can achieve all the desired command and control functions. However, because of the finite probability of failure of a link in the chain and because of the disastrous results of even momentary loss of control, the concept of providing deliberately redundant control systems for such craft have been given much attention in the recent past. The value of such redundancy can perhaps best be emphasized by pointing out that in the current generation of high speed aircraft, loss of control for a period of the order of 50 milliseconds typically results in loss of the craft; and for an expert pilot to detect failure and switch to a different mode of control or attempt any other corrective measure requires at least 750 milliseconds and, more typically, 1500 milliseconds. It may be seen that these reaction times are greater, by the formidable factors of 150 to 300, than the maximum permissible period for non-control. It may be noted that the small period of time permissible for lack of control is in part due to present aircraft often operating under conditions of inherent instability whereby loss of aerodynamic equilibrium for any such period of time creates an irreparable loss of control with the consequent catastrophic results of loss of the craft.

Previous approaches to providing redundancy have typically resulted in double control chains or channels in which a failure in one channel hopefully would permit the other channel to carry on the necessary command functions. Such systems, depending upon the particular failure suffered, generally experience at least a degradation of control when the failed channel is "dragged" by the operating channel.

Another typical approach has been to provide dual channels, one of which is an inactive or standby chain. Upon failure of the operating channel, an automatic switching occurs to inactivate the failed channel and transfer the control functions to the standby channel. Because of the previously inactive condition of the standby channel, an engage bump is likely to occur which can be severe and of serious consequence if it occurs during particular maneuvers. Additional transient difficulties may also be expected due, for example, to any accumulation of gases in the hydraulic lines and components. Furthermore if it becomes desirable to re-engage the first channel because of repairs made or because its operation all in all is better than that of the standby channel, both channels may require a momentary shut down.

Other approaches have been taken in the prior art but each has resulted in systems which have suffered one or more of the above disadvantages or has constituted a compromise otherwise in being, for example, excessively complex or having insufficient reliability or both, in being formidably expensive, in being too bulky and heavy, or in having intolerably high power requirements. Further disadvantages have stemmed from the fact that such systems have required the utilization of unproven hardware and have relied on functional concepts of questionable soundness.

Accordingly, it is an object of the present invention to provide a redundant hydraeric control system which is not subject to these and other disadvantages and limitations of the prior art.

It is another object to provide such a multiple channel redundant system in which all channels are normally active in a force sharing relation and in which, upon failure in any one channel, it is bypassed extremely quickly and the other channels continue to operate without control degradation and without engaging bumps or other deleterious transient effects.

It is another object to provide such a system in which, immediately upon failure in a second channel, a selected input portion of all channels is decoupled or deactivated and a selected output portion of all channels, including the previously bypassed one, is activated to function in parallel in response to input signals.

It is another object to provide a three-parallel channel form of such a system in which upon failure of one channel, it is immediately detected and that channel switched-out in a fail-operate mode without control degradation and in which upon failure of a second channel, all three are automatically immediately switched back to operation in a fail-safe mode utilizing only selected portions of each channel.

Briefly, these and other objects are achieved in accordance with the structural aspects of one example of the invention which includes a system common command or instructional signal control input which is coupled through three parallel control channels to a single movable member such as an aircraft control surface.

The output of each channel, in this example, is a hydraulically driven actuator connected to the single control surface for positioning it in response to the command or other signals fed into the channels.

Each channel also includes a servo valve first stage, an engage valve, a servo valve second stage, and a bypass valve. The servo valve first stage receives signals from the signal input and its output is coupled through the engage valve to the first input of the servo valve second stage. The servo valve second stage is in turn coupled through the bypass valve to the pressure chambers of the actuator.

The servo valve second stage also has a second input which, in response to a fail-safe signal received by the engage valve, is coupled to the command signal input and the first stage servo is disengaged.

The bypass valve has a pair of signal inputs; one for receiving a fail-operate signal in response to which the piston means of the actuator is bypassed permitting it to follow freely the motion of the control surface, and a second for receiving a subsequent fail-safe signal in response to which the actuator is again coupled to the output of the servo valve second stage.

The system further includes a hydraeric, in this example, comparator logic component which monitors a pressure signal output of the servo valve second stage of each of the three control channels. When any one of these monitored signals does not share a predetermined coincidence with the other two, a signal indicative of a failure occurring in that channel, for example, a fail-operate signal is immediately generated and impressed on the bypass valve of that channel. In this mode, the other two channels carry on exactly as before and the actuator of the failed channel freely follows the motion of the control surface, and, importantly, no control degrading occurs.

Whenever the remaining two monitored signals fail to share the required coincidence, the comparator generates a subsequent signal indicative of a failure occurring, for example a fail-safe signal, which actuates all the engage valves to (1) decouple all the first stage servo valves, (2) connect the second input of all the second stage servos to the system common instructional signal input, and (3) activate the bypass valve of the previously bypassed channel so that all three actuators are force coupled to their respective second stage servo valves thus providing hydraeric boost in the fail-safe manual control mode of operation.

Further details of these and other novel features and their principles of operation, as well as additional objects and advantages of the invention, will become apparent and be best understood from a consideration of the following description taken in connection with the accompanying drawing which is presented by way of an illustrative example only and in which:

FIGURE 1 is a combination block and schematic diagram illustrating the structural features of one example of a triple channel redundant hydraeric control system constructed in accordance with the principles of the present invention; and FIGURES 2, 3, 4 and 5 illustrate components which may be used in the system and show respectively an engage valve, a bypass valve, a shut-off valve, and a comparator valve.

Referring to the drawing and particularly to FIGURE 1, it is stressed that the particulars shown are by way of example and for purposes of illustrative discussion only, and are presented in the cause of providing what is believed to be the most useful and readily understood description of the principles of the invention. The details shown are not to be taken as a limitation upon the scope of the invention which is defined by the appended claims forming, along with the drawing, a part of this specification.

In the figure, an example of a hydraeric control system is illustrated which may, for purposes of description, be considered a hydraeric system providing a power boost control function linking the controls of a high performance aircraft represented by the stationary body 10 to a movable control surface 12 carried thereby. Force coupled between the control surface 12 and the body 10 are three hydraerically driven actuators 14, 16, 18, each having an actuator body 20, 22, 24, respectively, which is connected, in this example, to the control surface 12 with a piston member 26, 28, 30, respectively, connected to the fixed body 10. The indicated arrangement whereby the actuator body along with the remainder of the channel components moves with and inherently follows the position of the control surface, has been found to be highly advantageous in providing mechanical control loop feedback.

Each of the actuators 14, 16, 18 constitutes, in this particular example, a final power output stage for a respective one of three parallel control channels 32, 34, 36, the input signal means of which are coupled to a mechanical input signal linkage 38 shown here as having three signal force-sharing link extensions 40, 42, 44 interconnecting the common linkage 38 with a respective one of the channels 32, 34, 36. In this example, the mechanical linkage 38 may be considered as being directly connected to the pilot's control stick. In addition, and in what is deemed a helpfully simplified presentation, all the electrical command signals issuing from the cockpit or elsewhere are represented as being carried by the electric signal line 48. These signals typically may include pilot generated control signals, dual with those carried by the mechanical linkage 38, automatic take-off and landing signals, other ground control signals, and electric damper signals for stability augmentation. These electric control signals of whatever character are impressed upon the separate channels in parallel by the connecting leads 50, 52, 54, respectively. It is reiterated that the electrical network is shown in a highly simplified manner; however, the representation is deemed accurate and sufficient to describe and specify the structural concepts which the present invention involves.

Referring now to a typical one of the three control channels, viz. channel 32, it may be noted that, again in the cause of brevity and conciseness, many elementary, obvious, and conventional aspects and notations are deleted from the drawing. For example, hydraeric pressure supply and returns, and obvious mechanical and fluid connections, have been removed for clarity and emphasis of the novel aspects of the invention.

The input stage of the channel 32 is a servo valve first stage 56 which is of the character to provide a hydraeric output signal responsive in sense, phase, and magnitude to the electrical signals impressed upon its input terminal from the connecting lead 50. For further details of an example of such a servo stage which converts, in this example, voltage into spool displacement and hence controls the flow in a hydraeric circuit, the reader is referred to U.S. Patent No. 2,947,286, granted Aug. 2, 1960, for "Integrated Actuator" by G. T. Baltus and M. P. Wolpin.

The hydraeric signal output of the servo valve first stage 56 is coupled, as indicated, to a servo valve second stage 58 through an engage valve 60. The servo valve second stage is of the character having, in addition to its hydraeric signal input to control the axial position of its control spool assembly for in turn controlling the flow in a hydraeric output circuit, a pair of mechanical instrument signal input, engageable control rods 62, 64 which normally are held outwardly and ineffective against the springs 66, 68 by pressure within the end chambers 69 of the servo valve second stage 58. These end chambers are pressurized normally by a connection 71 through the engage valve 60 to a system supply pressure means. Accordingly, in such normal mode, the engage valve also couples together effectively, in a signal cascade manner, the first and second stages 56, 58.

The engage valve 60, for a non-normal mode of operation, is operable responsive to a subsequent failure, i.e. fail-safe, signal impressed upon its control signal input terminal 70 to disengage the normal coupling between the stages 56, 58 and simultaneously, through the connection 71 to remove the isolating pressure in the end chambers. The pressure removal permits the springs 66, 68 to urge the engageable control rods 62, 64 inwardly into direct engagement with the control spool assembly of the servo valve second stage 58. Motion then of the mechanical link members 72, 74 to which the engage springs 66, 68 are fixed causes a corresponding motion of the spool assembly within the second stage and constitutes an input mechanical control signal therefor. Thus, the pilot may manually control the aircraft through the mechanical input signal linkage even through the normal control channel function has failed.

This control signal may be the dual of the electrical signal applied to the first stage on the connecting lead 50. It may be seen, however, that in a mode where its mechanical dual is being applied, the effects of the electrical signal are effectively bypassed by the engage valve 60. For additional details, if desired, of structure and operation of other examples of the engage valve 60 and the second stage, dual alternative mode input servo valve 58, reference may be made to U.S. Patent No. 2,947,285, granted Aug. 2, 1960, for "Manual and Automatic Hydraulic Servomechanism" by G. T. Baltus and W. Beauchemin.

Figure 2:
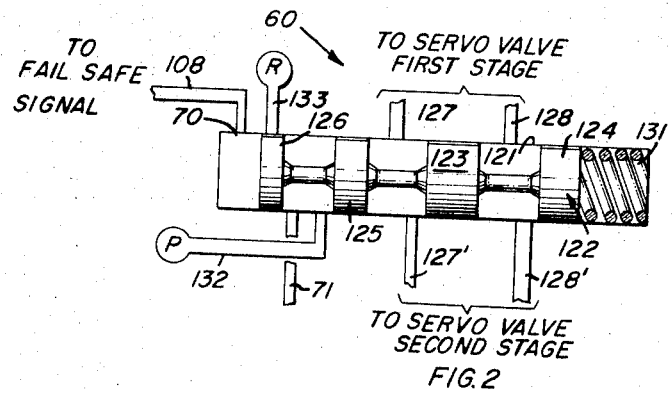

A more detailed understanding of the structure and operation of various of the apparatus which may be used in the system may be had by reference to applicant's copending patent application S.N. 481,981 entitled "Hydraeric Control System" which is assigned to the assignee of the present application. One such apparatus is the engage valve 60 as shown in FIGURE 2, which includes a cylinder 121 having a spool valve 122 slidably positioned therein. The spool valve includes interconnected lands 123 through 126, the spool valve being shown positioned in its normal (non-failure) state. A first pair of conduits 127 and 128 interconnect the first stage of the servo valve and the cylinder 121 while a second pair of conduits 127' and 128' interconnect the cylinder 121 and the second stage of the servo valve. As can be seen, the first and second stages of the servo valve are interconnected through the engage valve in its normal state. The input terminal 70 to the engage valve may comprise a port to which the conduit 108 is connected. During the normal state of operation system pressure is present in conduit 108 and the force of such pressure acting on the left face of land 126 maintains the spool valve 122 in the position shown compressing the spring 131. System pressure P is connected by conduit 132 from the source thereof through the valve and into conduit 71 to pressurize the end chambers 69 as above described.

In the event of a subsequent failure signal (fail-safe), system pressure is removed from conduit 108 and the force of spring 131 moves the valve spool 122 to the left as viewed in FIGURE 2. In such leftward position land 123 and 124 block conduits 127' and 128' respectively and land 125 blocks conduit 132 thus removing system pressure therefrom. If such is desired, system return R may be connected through conduit 133 to the cylinder 121 so as to be connected to conduit 71 when land 126 is moved leftward thus insuring rapid depressurization of end chambers 69.

It may be noted at this point that the link extension 40 of the mechanical input signal linkage 38 is connected pivotally to the actuator body 20 by a parallelogram force bar assembly including the two mechanical link members 72, 74 forming one pair of opposite sides connected by pivots 76, 78 to the link extension 40. The actuator body 20 forms the side opposite the link extension 40 and the links 72, 74 are connected thereto by a set of pivots 80, 82. Thus it may be seen the longitudinal motion of the link extension 40 does not normally directly tend to move the actuator. When, however, the system is in an auto-pilot mode, it is generally desirable that the mechanical linkages back to the control stick indicate and follow the control surface positioning. This permits the pilot to know, at least generally, what commands are being given to the control surfaces and it facilitates immediate and smooth manual override thereof by the pilot when desired. To accomplish such mechanical coupling between the control stick linkage and the control surface, the link 72 may be clamped to the body of the actuator valve assembly by a solenoid 84 which, when energized by an auto-pilot solenoid input signal on an electrical lead 86, holds the parallelogram frame rigidly to the position of the control surface 12.

Continuing with the description of the hydraerically operated control channel 32, the hydraeric output signals of the second stage servo valve 58 are coupled, normally, through a channel disabling device such as a bypass valve 88 to the actuating pressure chambers of the actuator 14. In this regard, it may be noted that this occurs irrespective of whether the input signals to the second stage are impressed thereon through the connected control rods 62, 64 or through the engage valve 60 from the first stage 56.

The bypass valve 88 is of the character having two alternative states of operating condition: the first being a normal or the fail-safe mode in which the bypass valve couples the hydraeric output signals from the servo valve second stage to the pressure chambers of the actuator; and a second state, or fail-operate mode, in which the bypass valve in response to a fail-operate signal impressed on its input signal terminal 90 from a line 92 isolates the actuator from the second stage and bypasses the piston 26 thereof by hydraerically shorting its pressure chambers.

The bypass valve 88 is further of the character to reverse its state immediately back to its normal mode in response to a subsequent failure, fail-safe, signal from the line 94 impressed upon its input signal terminal 96. In this manner hydraeric boost has been activated to assist the pilot in manual control of the aircraft during the fail-safe mode of operation. In the latter case, although the bypass valve 88 has been returned to its normal state, it may now be termed as in a fail-safe mode wherein the command signals for the channel 32 are impressed upon the connected control rod 62, 64; whereas in the initial or normal mode the input to the second servo stage 58 is from the servo first stage 56 in response to electrical signals impressed thereon from the lead 50. Further details, if desired, of the bypass valve 88 may be obtained from U.S. Patent No. 2,995,014, granted Apr. 26, 1960, for "Dual Electro-Hydraulic Servo Actuator System" by R. H. Horky and M. P. Wolpin.

Figure 3:
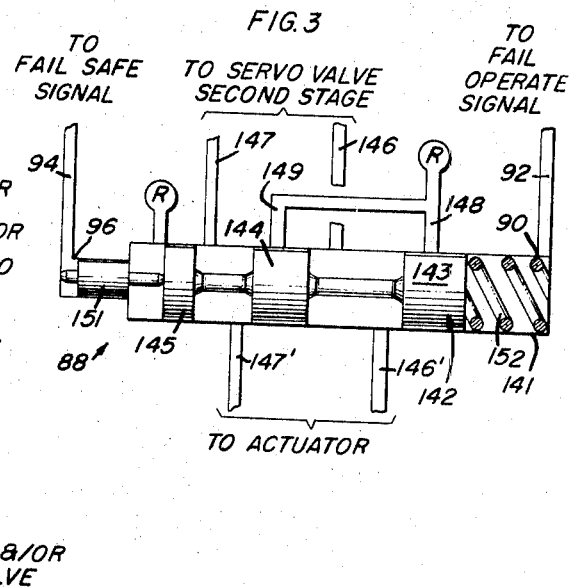

One form of apparatus which may be used as a bypass valve and described in said copending application is shown in FIGURE 3 to which reference is hereby made. As is therein shown the bypass valve 88 includes a cylinder 141 having a spool valve 142 slidably disposed therein and including interconnected lands 143, 144 and 145. Conduits 146 and 147 interconnect the servo valve second stage 58 and the bypass valve while conduits 146' and 147' interconnect the actuator and the bypass valve. Conduits 148 and 149 are connected between cylinder 141 and system return R. The input signal terminals 90 and 96 are shown as ports in cylinder 141 and are connected to lines in the form of conduits 92 and 94 respectively, conduit 92 being connected to receive a fail-operate signal and conduit 94 a fail-safe signal. An additional spool member 151 is slidably disposed in cylinder 141. The spools are shown in their normal (non-failure) state and are maintained there since system pressure is applied to conduits 92 and 94 during the normal state. As can be seen system pressure acting against the greater area of land 143 overcomes system pressure acting against the left face of spool 151. Under this normal state of conditions hydraeric fluid flows from the second stage of the servo valve, through the bypass valve and to the actuator as shown.

In the event of a fail-operate signal being generated by the comparator and signal generator 102 system pressure is removed from conduit 92. Under these conditions, system pressure in conduit 94 acting against spool 151 moves the spools 141 and 151 toward the right as viewed in FIGURE 3 and compresses spring 152.

When spool 141 is in its rightward position, lands 144 and 145 block conduits 146 and 147 respectively thus isolating the actuator from the second stage 58 of the servo valve. Also lands 143 and 144 uncover the ports connected to conduits 148 and 149 respectively and connect system return R to the actuator through conduits 146' and 147'. Thus it can be seen that the chambers on each side of the piston 26 (FIGURE 1) of the actuator are shorted or bypassed.

In the further event of a subsequent (fail-safe) signal being generated by the comparator and signal generator 102, system pressure is removed from conduit 94. Under these conditions the force of spring 152 returns the spools 141 and 151 to the position illustrated in FIGURE 3 once again connecting the second stage 58 of the servo valve to the actuator.

Figure 4:
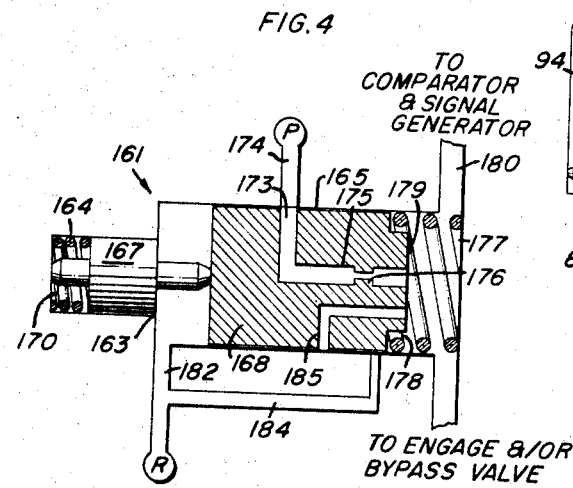

The manner in which system pressure is applied and removed on the occurrence of fail-operate and fail-safe signals will now be described. Shut-off valve means is provided in the comparator and signal generator 102 and is described in said copending application and is also illustrated in FIGURE 4. The shut-off valve 161 comprises a cylinder 163 having a bore 164 of a first diameter and a bore 165 of a second and greater diameter. Disposed within the bore 164 is a spool valve 167, while disposed within the bore 165 is orifice valve 168. One end face of spool valve 167 is subjected to a source of force such as that exerted by spirng means 170. Orifice valve 168 has a transverse bore 173 therein which, when the valve 168 is in the position illustrated, communicates with source of system pressure P by way of conduit 174. A longitudinal bore 175 is also provided in the orifice valve 168 and communicates with the bore 173 and thus the source of pressure P. A restriction orifice 176 is provided in the bore 175 for purposes well known in the prior art. Resiliently deformable means such as a spring 177 is seated about a shoulder 178 formed in the face 179 of the orifice valve 168. The force generated as a result of the spring 177 and the source of pressure P present within the conduit 180 operating upon the face 179 of the valve 168 is greater than the force generated as a result of the spring 170 operating upon the left face of the valve 167 disposed within the bore 164. Therefore, the force thus generated maintains the valves 167, and 168 in the position illustrated in FIGURE 4.

It should also be noted that the bore 165 is ported to system return through conduits at 182 and 184. Also provided in the valve 168 is an unrestricted shorting bore 185 which comumnicates with conduit 180 at one end thereof. The shorting bore 185 at its opposite end terminates at the surface of orifice valve 168; however, in the normal operating condition of the control system this opposite end is closed by the walls defining bore 165.

Under normal operating conditions, that is when the comparator finds no errors insofar as the signals applied thereto from the second stages of the servo valves are concerned, the shut-off valve means remain in the non-actuated position such as that illustrated in FIGURE 4. As was above referred to, the shut-off valve is maintained in the position illustrated in FIGURE 4, by having exerted thereon a greater pressure on the right hand portion, as viewed in FIGURE 4, than on the left hand portion thereof.

Assuming now that the comparator detects a non-coincidence in the signals applied thereto, system return R is automatically connected to the conduit 180. Upon the occurrence of the connection of conduit 180 to return R, it can be seen that the only pressure applied to the right hand side of the shut-off valve 161 is the pressure of spring 177 acting against the shoulder 178. Hydraeric pressure source P is connected through bore 175 and restriction orifice 176 to conduit 180 thus precluding any substantial loss of system pressure at other points. Thus, the left end face of spool valve 167 has the force from spring 170 acting thereagainst which is greater than the force generated by spring 177 alone. Under these circumstances orifice valve 168 is translated toward the right as viewed in FIGURE 4. As the valve 168 translates toward the right as viewed in FIGURE 4, the conduit 174 is first cut-off by moving the bore 173 out of register therewith. After this occurs, the shorting bore 185 registers with the port connected to conduit 184 thus connecting the conduit 180 directly to the return R. By thus connecting conduit 180 directly to return R through the unrestricted shorting bore 185, any fluid flow therein is ported directly and unrestricted to return.

Obviously, the required number of shut-off valves of the type above descibed will be used in conjunction with the various elements in the comparator to generate the necessary signals needed to effect operation of the system as above disclosed.

Figure 5:
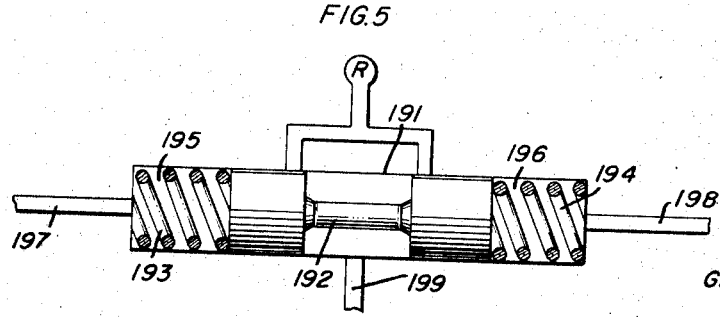

Referring now to FIGURE 5, there is shown one form of apparatus, also disclosed in the copending application which may be used to construct a comparator and signal generator in accordance with the present invention. As is therein illustrated a cylinder 191 has a spool valve 192 slidably disposed therein between springs 193 and 194 so as to define chambers 195 and 196 at each end thereof. Lines such as conduits 197 and 198 are connected respectively to chambers 195 and 196. The opposite ends of the conduits 197 and 198 are adapted for receiving pressure signals from the control channels. So long as the pressure signals are equal the spool valve remains in the position illustrated. Should there be a lack of coincidence in the pressure signals the spool valve 192 will translate and in so doing will connect conduit 199 to system return R. The opposite end of conduit 199 may be connected to the bypass or engage valves as above described, and may also be connected to the shut-off valve as above described to preclude reactivation of a failed channel. One skilled in the art can logically connect required ones of said devices illustrated and above described to produce the fail-operate and fail-safe signals herein referred to and further explanation thereof is not deemed necessary.

Also carried by the actuator body in a manner to follow the positioning of the control surface 12 is a feedback generator 98 which mechanically is linked to the body 10, as shown, for providing electrical feedback signals, indicative of the motion and position of the control surface 12 relative to the body 10, on the lead 100 to the input stages of the channel for completing the control loop when operating in an electrical input mode.

As noted above, each of the control channels 32, 34, 36 may be considered, for this example, as being functionally and structurally identical; hence it is deemed preferable not to reiterate a complete description of each of the channels 34 and 36. It suffices here to describe their mutual cooperation and their cooperation with hydraeric comparator and signal generator network 102.

Each of the channels 32, 34, 36 is coupled by a pressure monitor line 104, 104′, 104″ from its respective second servo valve stage to the comparator and signal generator network 102. By this means the comparator logic continuously compares the operational status of a predetermined hydraeric condition in each of the second stages. When the monitored signal from any one of the three channels fails to share any predetermined coincidence such as their instantaneous phase or magnitude, the signal generator provides a failure indicating signal. The first such signal is a fail-operate signal which is applied along the signal line 92, 92′, or 92″ of the failed or non-coincident channel. As described above, this signal causes the particular bypass valve to isolate hydraerically the piston of its associated actuator whereby that actuator henceforth floats or merely follows the motion and position of the control surface 12; and the latter continues to be controlled exactly as before by the force sharing relation of the remaining two channels without control degrading.

If a second failure should occur whereby the remaining two channels fail to share their prescribed coincidence, a subsequent failure indicating, fail-safe, signal is generated by the logic network and it is conveyed along the lines 106, 106′, 106″ to all the engage valves, as at terminal 70 of the engage valve 60 in the channel 32, and at the same time to the reversing input terminal 96 of the bypass valve 88 which was previously caused to inactivate its actuator in response to the first, or fail-operate, signal. In the case of the channel 32 having first suffered a failure and then, subsequently, one of the other channels 34, 36 indicating a failure, the second or fail-safe signal from the logic network 102 is transmitted to channel 32 along the line 106 and thence along the branch line 108 to the terminal, or input signal port, 70 of the engage valve 60. This disengages the first stage servo valve 56 and engages the links 72, 74 to control the servo valve second stage 58 while simultaneously impressing the fail-safe signal through the line 94 to the reversal input terminal 96 of the bypass valve 88 to reverse its state back to its normal operation.

Throughout this specification it has been noted that, in a fail-operate mode of operation of the examples of the invention discussed, control positioning of the surface 12 by the system is not degraded by the passive status of the bypassed actuator. It should be pointed out that of course this conclusion is based upon the assumption that the control system is sized, in its designed capability, so that any two active ones of the three actuators can supply sufficient forces to the control surface to handle all contemplated loading thereof.

There has thus been disclosed and described a relatively particular example of a triple channel redundant hydraeric control system embodying the structural concepts of the invention, achieving the objects set forth hereinabove, and exhibiting the advantages discussed earlier. Again, however, it is stressed that the particular controlled member upon which the system in accordance with the present invention has been shown to operate forms no part of the present invention.

What is claimed is:

1. Redundant control system for force positioning a movable member in response to instructional control signals, the system comprising:
three functionally parallel control channels of the character to receive the instructional signals and each being connected to the movable member,
each said control channel including:
system input signal means for receiving the instructional signals;
hydraerically driven actuator means having piston means force coupled to said movable member;
second stage servo valve means having output ports normally hydaerically coupled to said piston means and having hydraeric signal input port, fail-safe signal input means, engage means and instructional signal input means coupled to said engage means for coupling said system input signal means to said second stage servo valve means in response to a predetermined fail-safe signal impressed upon said fail-safe signal input means;
first stage servo valve means having input signal receiving means coupled to said system input signal means and having hydraeric output port normally coupled to said hydraeric input port of said second stage servo valve means;
controllable engage valve means hydraerically intercoupled between said first and second stage servo valve means for selectively, responsive to a pretermined fail-safe signal, effecting decoupling of said normally coupled hydraeric output port of said first stage servo valve means from said second stage valve means; and
controllable bypass valve means hydraerically intercoupled between said second stage valve means and said piston means of said actuator means for selectively, responsive to a fail-operate signal, bypassing said actuator piston means while substantially coincidentally effecting decoupling of the normally coupled second stage valve output port from said piston means
and hydraeric comparator and signal generator means coupled to each second stage servo valve means for (1) monitoring and comparing signals therefrom indicative of the operational status of each said channel and for (2) generating a fail-operate signal when such status signals from one channel do not share a predetermined coincidence with those from the other two channels, for (3) impressing said fail-operate signal upon the said bypass valve means of said one channel means for causing its said bypassing and decoupling to occur, for (4) generating a fail-safe signal when the status signals from the two non-bypassed channels do not share a predetermined coincidence for (5) impressing said engage means of said second stage means and fail-safe signal upon each of said engage means of said second stage means and engage valve means for causing their respective said coupling and decoupling to occur and for (6) impressing said fail-safe signal upon said bypass valve means for causing each of said bypass valve means to operate again in its normal, non-bypassing mode whereby position of said movable member is achieved by operation of all said second stage servo valve means responsive to said instructional control signals impressed upon said instructional signal input means of each said second stage servo valve means.

2. Redundant control system as defined in claim 1 in which said instructional signal input means is a mechanical signal transfer element for impressing control signals from said system input signal means upon said second stage servo valve means; and said input signal means of said first stage servo valve means is an electrical signal propagation element for impressing control signals from said system input signal means upon said first stage servo valve means.

3. Redundant control system for positioning a controlled member in response to control signals comprising:
a plurality of control channels each including a servo valve adapted to receive electrical and mechanical signals and actuator means controlled by said servo valves and adapted for connection to said controlled member;
means for generating a signal indicative of a failure occurring in any control channel;
disabling means connected to each channel to render a failed control channel ineffective in response to a first failure signal; and
hydraeric boost activating means connected to each channel responsive to a subsequent failure signal for rendering ineffective the electrical signal to each channel and for rendering effective all previously failed control channels, whereby each of said plurality of control channels is responsive only to said mechanical signal.

4. Redundant control system as defined in claim 3 wherein said servo valves each include first and second stages and said mechanical signal is applied simultaneously to each of said second stages.

5. Redundant control system as defined in claim 4 wherein said activating means for rendering ineffective the electrical signal to each channel is an engage valve means operatively interconnected between first and second stages of each servo valve to deactivate said first stage in response to said subsequent signal.

6. Redundant control system as defined in claim 5 wherein said disabling means is a bypass valve operatively connected between said second stage and said actuator means in each channel and responsive to said first failure signal to preclude hydraeric fluid flow between said second stage and said actuator means and responsive to said subsequent signal to permit hydraeric fluid flow between said second stage and said actuator means.

7. Redundant control system as defined in claim 6 which further includes supporting body means and in which said actuator means includes piston means connected to said supporting body means and an actuator body member affixed to said controlled member for housing said piston means and which further includes mechanical signal input means connected to said actuator body member for impressing said mechanical signals thereupon.

8. Redundant control system as defined in claim 7 which further includes mechanical position feedback means connected to said actuator body member and said supporting body means for generating signals indicative of the displacement of said controlled member with respect to said supporting body means.

References Cited

UNITED STATES PATENTS

| | | | |
|---|---|---|---|
| 2,990,145 | 6/1961 | Hougland | 91—363 |
| 3,070,071 | 12/1962 | Copper | 91—363 |
| 3,095,783 | 7/1963 | Flindt | 91—363 |
| 3,136,224 | 6/1964 | Escabosa | 91—363 |
| 3,190,185 | 6/1965 | Rasmusson | 91—216 |
| 3,240,124 | 3/1966 | Howard et al. | 91—216 |

PAUL E. MASLOUSKY, *Primary Examiner.*

U.S. Cl. X.R.

91—363, 384, 411, 446; 244—77